UNITED STATES PATENT OFFICE.

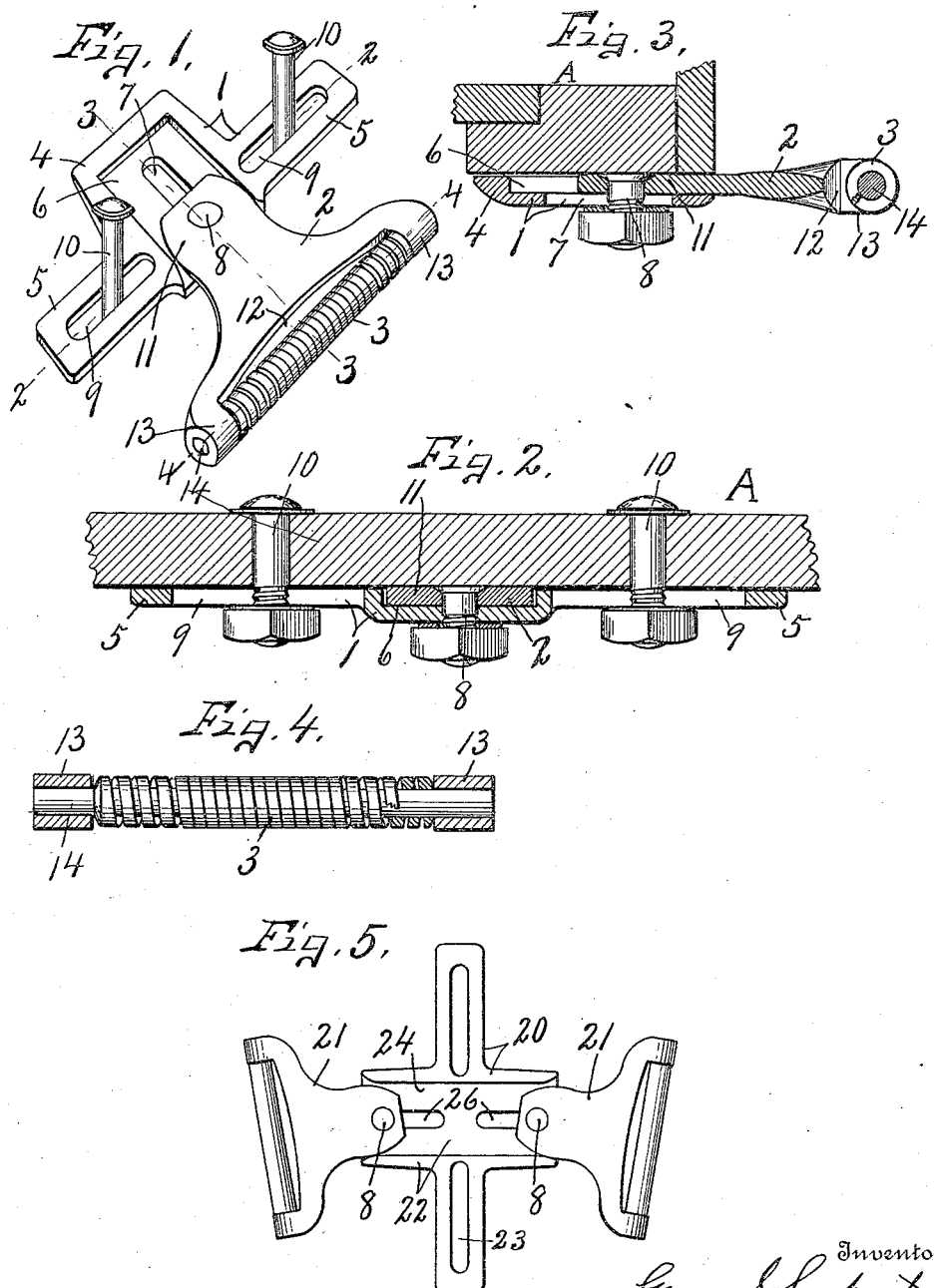

GEORGE SCHUBERT, OF ONEIDA, NEW YORK.

RUB-IRON FOR VEHICLES.

1,074,213.  Specification of Letters Patent.  Patented Sept. 30, 1913.

Application filed October 27, 1911. Serial No. 657,160.

*To all whom it may concern:*

Be it known that I, GEORGE SCHUBERT, of Oneida, in the county of Madison, in the State of New York, have invented new and useful Improvements in Rub-Irons for Vehicles, of which the following, taken in connection with the accompanying drawings, is a full, clear, and exact description.

This invention relates to certain improvements in rub-irons for vehicles adapted to be attached either to the body or to the reach of a wheel vehicle to prevent contact of the steering wheels with said body or reach.

The primary object is to provide a practically noiseless roller rub-iron capable of being adjusted longitudinally, transversely and to different angles relatively to the body or reach so that it may readily be brought into the most efficient relation with the wheel with which it is adapted to coöperate without changing the positions of the fastening means by which the main supporting plate is secured to said body or reach.

Another object is to provide resilient means for frictionally holding the roller against rattling due to endwise or lateral movement upon its support.

A further object is to provide simple means whereby the adjustable roller supporting plate is additionally held in its adjusted position irrespective of the means by which the main supporting plate is clamped to the body or reach.

Other objects and uses will be brought out in the following description.

In the drawings:—Figure 1 is a perspective view of my improved rub iron as applied to one side of the body of a vehicle. Figs. 2, 3 and 4 are enlarged detail sectional views taken respectively on lines 2—2, 3—3 and 4—4, Fig. 1, a portion of the coil spring roller being shown in elevation in Fig. 4. Fig. 5 is a plan of a duplex rub iron adapted to be applied to the reach or other portion of the running gear of a vehicle.

The rub iron shown in Figs. 1, 2, 3 and 4 comprises a main supporting plate —1—, a roller supporting plate —2— and a chafing roller —3—, the plate —1— consisting of a transversely elongated central portion —4— and opposite longitudinally extending ears or lugs —5— formed integral with opposite sides of the central portion or main body —4—. This main body —4— is provided in its upper face with a transversely elongated recess —6— opening from its outer end and provided in its bottom with a lengthwise slot —7— for the reception of a clamping screw or bolt —8— by which the roller supporting plate —2— is held in operative position.

The opposite ears —5— are provided with lengthwise elongated slots —9— for receiving clamping bolts —10— by which the main supporting plate —1— is secured to the underside of a vehicle body —A—, a portion of which is shown in Figs. 2 and 3.

The object of the elongated slots —9— is to permit a limited longitudinal adjustment of the rub iron in either direction without changing the position of the fastening means, as the bolts —10—, by which the main supporting plate —1— is secured to the vehicle body. The purpose of the transversely elongated slot —7— is to permit a similar transverse adjustment of the roller supporting plate —2— as may be required for different widths or heights of the vehicle body relatively to the front wheel.

In addition to the function of the clamping bolt —8— for clamping the roller supporting plate —2— in its adjusted position, it also serves as a pivotal connection between said roller supporting plate and main supporting plate —1— to permit said roller supporting plate to be rocked to different angles relatively to the main body of the vehicle as may be required to conform to the angle of contact with the wheel. For this latter purpose the plate —2— is provided with an inwardly projecting extension —11— having a counter sunk aperture —12— for receiving the pivotal clamping bolt —8—, said extension —11— being substantially flat and has its opposite edges near the pivot —8— convexed or curved longitudinally, while the outer end of the recess —6— is flaring or wider than its inner end to permit the plate —2— to be rocked laterally upon the pivot —8— in either direction to different angles, as illustrated more clearly in Fig. 5.

As previously stated the extension —2— is substantially flat and is somewhat thicker than the depth of the recess —6— so as to project slightly above the horizontal flat plane of the upper surface of the main supporting plate —1— whereby when said supporting plate is clamped against the underside of the vehicle body, the roller supporting plate —2— will be frictionally clamped between the bottom of the recess —6— and underside of the vehicle body by the tightening of the bolts —10— to additionally hold the roller supporting plate —2— in its adjusted position irrespective of the clamping bolt —8—.

The outer end of the plate —2— is elongated laterally in opposite directions and equi-distant from the extension —11— and is provided with a recess —12— opening from its outer side to form similar arms or bearings —13— which are provided with lengthwise alined openings centrally therethrough for receiving and supporting the ends of a roller supporting pin —14— as best seen in Figs. 3 and 4. This pin or shaft —14— extends across the recess —12— between the arms —13— for receiving and supporting the roller —3— which, in this instance, consists of a cylindrical coil of spring wire preferably of angular cross section having its intermediate helices compressed into close juxtaposition and the helices of its opposite ends spaced slight distances apart with the end helices spring tensioned against the inner faces of the bearings —13— so as to hold the roller against rattling by endwise or lateral movement, the outer faces of the end helices being preferably rounding or convexed so as to reduce friction with the bearings —13— and thereby permit the roller to turn more freely on the spindle —14— when engaged by a revolving vehicle wheel not shown.

The rub iron is usually adjusted so that its intermediate portion will be engaged by the vehicle wheel and the main object in bringing the helices of this portion of the coil into close contact is to afford a continuous contact surface for the wheel, while the purpose in spacing the end helices slight distances apart is to enable the spring to be compressed between the bearings —13— upon the spindle —14— so that the end helices will expand into contact with said bearings to automatically take up wear and hold the roller against endwise rattling movement.

In Fig. 5 I have shown a rub iron adapted to be secured to a portion of the running gear as, for example, the reach of wagons in which the wheels turn under the box or body, said rub iron consisting of a main supporting plate —20— and opposite roller supporting plates —21— which are substantially the same as the plate —2— shown in Fig. 1. The main supporting plate —20— is also similar to the plate —1— except that its main body as —22— is elongated laterally some distance to opposite sides of the longitudinally slotted arms —23— and is provided with a lengthwise recess —24— extending from side to side so as to permit longitudinal adjustment of the plates —21— therein. The ends of the recess —24— are flaring to permit lateral rocking movement of the plates —21— to different angles to conform to the angle of contact of the wheels therewith, said plate —20— being also provided with slots —26— for receiving the clamping bolts or pivotal pins —8— by which the plates —21— are secured to the main supporting plate —20—. Otherwise the plates —20— and —21— are quite similar to the plates —1— and —2— shown in Figs. 1, 2 and 3. In both of these forms of my invention, the main supporting plate is secured by the clamping bolts —10— to the body or reach of the vehicle in approximately the position required to hold the rub irons in the path of movement of the steering wheels, the slots —9— affording means for longitudinal adjustment to more accurately adjust the rub irons to the wheels. The roller supporting plates —2— are then clamped in place by means of the bolts —8— with the center of the rub iron in position to contact with the underturning steering wheel, said plate being adjustable transversely or about its pivotal axis —8— so as to conform more accurately to the position of the wheel when in contact with the roller.

When the plates —1— and —2— are properly positioned they may be firmly clamped in place by the bolts —8— and —10— as shown in Fig. 1 or by the bolts —8— as shown in Fig. 5.

What I claim is:

1. A rub iron comprising a main supporting plate having a recess in one side, a roller supporting plate having an extension slidable in the recess, a chafing roller on the last named plate, and means for securing the roller supporting plate to the main supporting plate.

2. A rub iron for vehicle wheels comprising a main supporting plate having oppositely projecting slotted arms and a transversely elongated recess in one side between the arms, a roller supporting plate slidably mounted in the recess and pivotally connected to the main supporting plate for lateral rocking movement in either direction, and a chafing roller on the supporting plate.

3. A rub iron for vehicle wheels comprising a main supporting plate having oppositely projecting slotted arms, means passed through the slots in said arms for clamping the plate to a portion of the vehicle, said plate being provided with a transversely elongated recess, a roller supporting plate mounted for sliding and rocking movement in said recess, means for clamping the plates to each other, and a chafing roller on the roller supporting plate.

4. In a rub iron and roller supporting plate having bearings spaced some distance apart, a coil spring compressed between and tensioned against said bearings, and means for holding the spring in operative position, said spring having the helices of its intermediate portion in close contact and its end helices spaced apart and spring pressed against the inner faces of the bearings.

5. A rub iron comprising a main supporting member having oppositely projecting slotted arms, a roller supporting member mounted on the main supporting member between said arms and adjustable transversely thereof, and means for clamping the roller supporting member in its adjusted position.

In witness whereof I have hereunto set my hand on this 10th day of October 1911.

GEORGE SCHUBERT.

Witnesses:
H. E. CHASE,
E. F. SPEARING.

Copies of this patent may be obtained for five cents each, by addressing the "Commissioner of Patents, Washington, D. C."